United States Patent
Venkatakrishnan et al.

(10) Patent No.: US 10,764,222 B2
(45) Date of Patent: Sep. 1, 2020

(54) EMOJI COMMANDED ACTION

(71) Applicant: PAYPAL, INC., San Jose, CA (US)

(72) Inventors: Poornima Venkatakrishnan, San Jose, CA (US); Megan Marie O'Neill, Santa Cruz, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/141,897

(22) Filed: Sep. 25, 2018

(65) Prior Publication Data

US 2019/0149502 A1    May 16, 2019

Related U.S. Application Data

(63) Continuation of application No. 14/991,102, filed on Jan. 8, 2016, now Pat. No. 10,084,738.

(60) Provisional application No. 62/245,870, filed on Oct. 23, 2015.

(51) Int. Cl.
| | |
|---|---|
| *H04L 12/58* | (2006.01) |
| *G06Q 20/32* | (2012.01) |
| *G06Q 20/10* | (2012.01) |
| *G06F 3/0481* | (2013.01) |
| *G06F 3/0484* | (2013.01) |
| *H04L 29/06* | (2006.01) |
| *G06Q 30/02* | (2012.01) |
| *H04M 7/12* | (2006.01) |
| *H04M 7/00* | (2006.01) |
| *G06F 3/0488* | (2013.01) |
| *G06Q 30/06* | (2012.01) |

(52) U.S. Cl.
CPC .......... *H04L 51/18* (2013.01); *G06F 3/04817* (2013.01); *G06F 3/04842* (2013.01); *G06Q 20/10* (2013.01); *G06Q 20/108* (2013.01); *G06Q 20/3224* (2013.01); *H04L 51/16* (2013.01); *H04L 51/32* (2013.01); *H04L 63/08* (2013.01); *H04L 63/102* (2013.01); *H04L 63/105* (2013.01); *G06F 3/04883* (2013.01); *G06Q 30/0238* (2013.01); *G06Q 30/06* (2013.01); *H04M 7/0027* (2013.01); *H04M 7/1295* (2013.01)

(58) Field of Classification Search
CPC .. G06Q 20/108; G06Q 20/10; G06Q 30/0238; G06Q 30/06; H04M 7/0027; H04M 7/1295; G06F 3/04842; G06F 3/04817; G06F 3/04883; G06F 3/0482
See application file for complete search history.

(56) References Cited

U.S. PATENT DOCUMENTS

| | | | |
|---|---|---|---|
| 7,921,292 B1 | 4/2011 | Pauker et al. | |
| 8,108,678 B1 | 1/2012 | Boyen | |
| 8,160,960 B1* | 4/2012 | Fei | G06Q 20/10 |
| | | | 705/39 |
| 2003/0138765 A1 | 7/2003 | Bowers | |
| 2005/0026130 A1 | 2/2005 | Crowhurst et al. | |
| 2005/0143108 A1 | 6/2005 | Seo et al. | |
| 2006/0015560 A1 | 1/2006 | MacAuley et al. | |
| 2007/0006177 A1 | 1/2007 | Aiber et al. | |

(Continued)

*Primary Examiner* — Kyung H Shin
(74) *Attorney, Agent, or Firm* — Haynes and Boone, LLP

(57) ABSTRACT

A system and method for receiving and executing emoji based commands in messaging applications. The system and method may include processes such as identifying emojis in a message, determining one or more action based on the emoji, and completing the determined actions.

20 Claims, 6 Drawing Sheets

(56) References Cited

U.S. PATENT DOCUMENTS

| | | |
|---|---|---|
| 2008/0084972 A1 | 4/2008 | Burke et al. |
| 2011/0125743 A1 | 5/2011 | Immonen et al. |
| 2011/0125744 A1 | 5/2011 | Immonen et al. |
| 2011/0167277 A1 | 7/2011 | Kitamura et al. |
| 2012/0054456 A1 | 3/2012 | Grube et al. |
| 2012/0059787 A1 | 3/2012 | Brown et al. |
| 2012/0084135 A1* | 4/2012 | Nissan ............... G06Q 30/0238 705/14.38 |
| 2014/0025766 A1 | 1/2014 | Beck et al. |
| 2014/0136407 A1* | 5/2014 | Hazam ................ G06Q 20/108 705/42 |
| 2014/0351713 A1 | 11/2014 | Hallerstrom et al. |
| 2015/0019655 A1 | 1/2015 | Kizhakkiniyil et al. |
| 2015/0036813 A1* | 2/2015 | Ananthakrishnan .......................... H04M 7/0027 379/265.09 |
| 2015/0081349 A1* | 3/2015 | Johndrow ........... G06Q 20/3224 705/5 |
| 2015/0099490 A1 | 4/2015 | Whitten et al. |
| 2015/0264022 A1 | 9/2015 | Manvi et al. |
| 2015/0278813 A1 | 10/2015 | Yue et al. |
| 2015/0331590 A1* | 11/2015 | Yasui .................. G06F 3/04842 715/765 |
| 2016/0055533 A1 | 2/2016 | Tanio et al. |
| 2017/0011383 A1 | 1/2017 | Melzer |
| 2017/0118189 A1 | 4/2017 | Venkatakrishnan et al. |

\* cited by examiner

510C  Person 1  531C
      $10 from @megan, @oolong for 🍕🍎

520C  System    BOT  10:34AM
      Requested:
            $5 to @megan
            $5 to @oolong!

FIG. 5C

510  System    BOT  12:01 PM  541
⏰ Its been 3 day! Pay @Person1  $5 for 🍕🍎 @megan, @oolong!
              551

FIG. 5D

510  System    BOT  12:01 PM ✦
Hurrah! @megan paid  @Person1         $5 for 🍕
561

FIG. 5E

EMOJI COMMANDED ACTION

CROSS REFERENCE TO RELATED APPLICATIONS

This application is a continuation of and claims priority to U.S. patent application Ser. No. 14/991,102, filed Jan. 8, 2016, which claims priority of U.S. Provisional Application No. 62/245,870, filed Oct. 23, 2015, and is related to U.S. patent application Ser. No. 14/991,880, filed Jan. 8, 2016, now issued U.S. Pat. No. 10,033,678, which are incorporated herein by reference in their entirety.

TECHNICAL FIELD

The present disclosure generally relates to messaging based controls and more specifically enabling Emoji based commands.

BACKGROUND

As online messaging has become more and more prevalent, a new form of short hand communications has developed using emojis. For example, emojis are used to express certain feelings and/or provide context to an electronic message. Often, people use emojis to fill in the loss of communicated information in normal face-to-face conversations that would normally occur through tone of voice, body language, inflections, and/or the like. The difference between an offensive remark and playful remark can depend on how the statement is presented. Similarly, a recipient of a textual message may be insulted if read in one way and amused if read in another way. However, the sender of the message has little control on how a recipient of a message is going to read the message. A sender may write the message carefully such that the message as innocuously as possible. However, the sender may find writing innocuous messages to be cumbersome and overly verbose. Furthermore, humorous messages often teeter on the line of offensive and funny.

Emojis are a good way for a sender to indicate how the author of the message intends to communicate the message. For example, adding a smiley face emoji or a laughing emoji to the end of a harsh statement may indicate that the statement is made in jest.

Emojis are also useful as a short hand to convey a thought or feeling in a message. Emojis may aid in conveying a message in a more whimsical and light hearted manner. In many cases, emojis can be used to discuss a heavy and/or tense subject in a less serious manner. For example, an angry face or sad face emoji may be a less socially awkward way of expressing an emotion to a recipient instead of bluntly stating with words that the recipient has made them angry or sad. Senders of messages may also find that conveying a message with emojis is less likely to incite a defensive response.

Additionally, in some cases having a third party for certain communications may also be beneficial. Often times, having a third party mediator provide an uncomfortable message may reduce the tension among the parties involved. For example, consultants are sometimes hired by a company to provide an independent solution to a problem which may involve uncomfortable truths, such as having to reduce the number of employees and/or selling the company. By having an independent consultant determine and communicate the uncomfortable solution, relationships between the employees and managers of the company may be less stressed than had the solution been advised and communicated by the managers.

As such, it would be beneficial to implement a system and method of emoji based commands such that the emojis may be used for uncomfortable subject matter. Furthermore, it would be beneficial if the system and method could leverage the benefits of having a neutral third party communicate some of the messages along with the emoji based commands.

BRIEF DESCRIPTION OF THE FIGURES

FIG. 5A-5E illustrates exemplary emoji based command messages and responses from a system implementing the commands.

Figure 1:
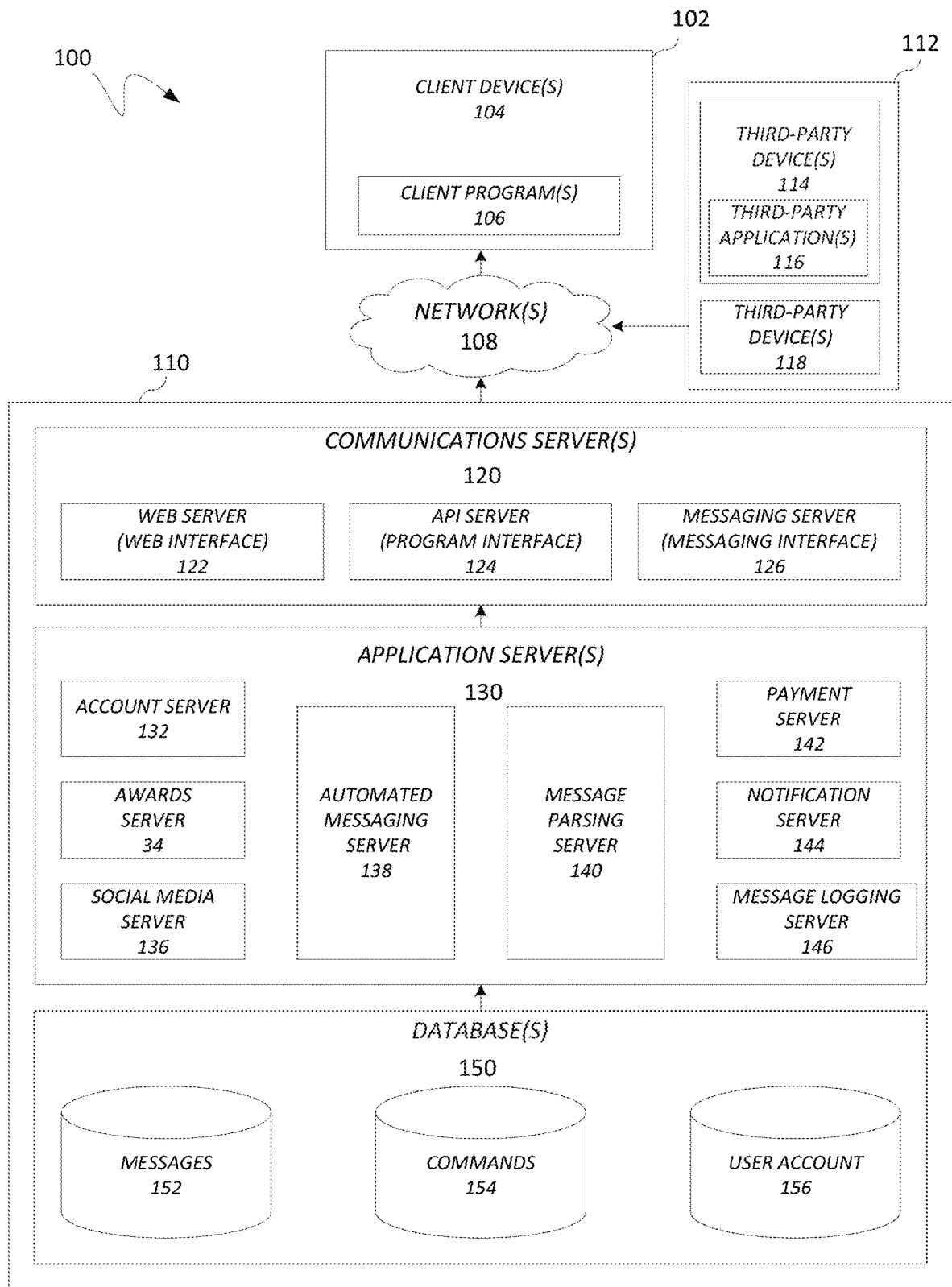
FIG. 1 is a block diagram of an exemplary computing system that is adapted for implementing a system for emoji based commands.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

FIG. 1 illustrates, in block diagram format, an exemplary embodiment of a computing system adapted for receiving and executing Emoji based commands. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting a third-party applications 116 and third-party devices 118. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as message logging, message transferring, command recognition, security functions, and/or other services, some of which will be discussed in greater detail below. Third-party servers 114 and/or third-party applications 116 may also provide system 110 and/or client 102 with other information and/or services, such as email services and/or information, social networking services and/or information, property transfer and/or handling, purchase services and/or information, and/or other online services and/or information.

In one embodiment, third-party servers 114 may include a social networking server that hosts a user's social network account. In another embodiment, third party-servers 114 may include an email server that hosts a user's email account. In some embodiments, third-party servers 114 may include an instant messaging server that receives and transmits electronic messages from a user account. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, merchandise recommendations, product discount notifications, product locating, product purchasing and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various product purchasing, product discounting, property transfer, notification, and social connection services. Application server 130 of network-based system 110 may provide services such as, account services, authentication services, content management services, payment services, user data gathering services, return services, product purchasing services, delivery services, location services, notification services, fund transfer, funds and/or currency exchanges, gifting services, and/or other services. Application servers 130 may include an account server 132, an automated messaging server 138, a message parsing server 140, a payment server 142, a notification server 144, and/or a message logging server 146. Application servers 130 may further include awards server 134 and a social media server 136. These servers, which may be in addition to other servers, may be structured and arranged to aid in receiving and executing emoji based commands that are sent through a messaging application as discussed above and in more detail below.

Application servers 130, in turn, may be coupled to and capable of accessing one or more databases 150 including a messages database 152, a commands database 154, and/or user account database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
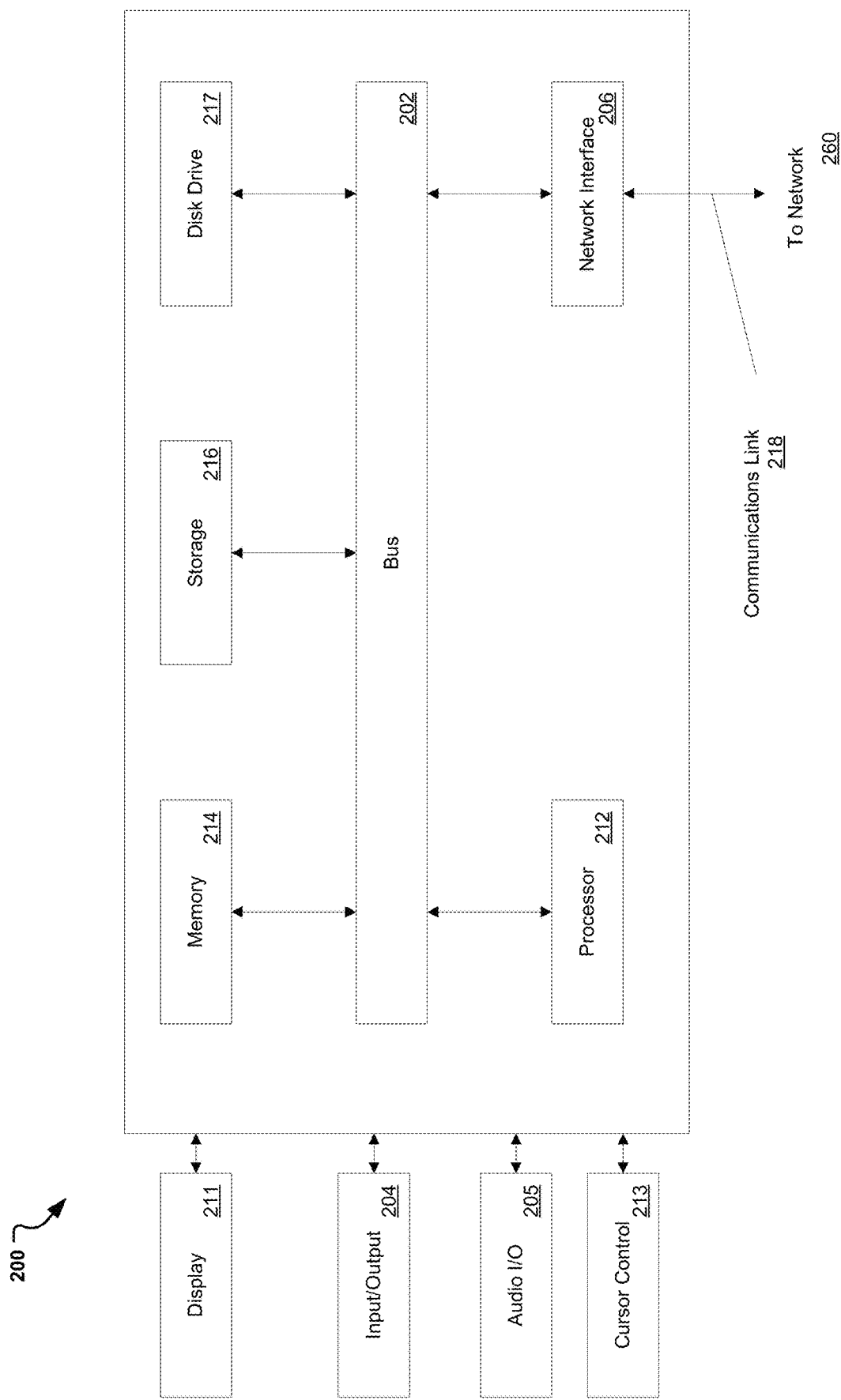
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, smart watch, and/or the like) that is capable of communicating with a network. A service provider and/or a payment provider may utilize a network computing device (e.g., a network server) capable of communicating with the network. It should be appreciated that each of the devices utilized by users, service providers, and/or payment providers may be implemented as computer system 200 in a manner as follows.

Additionally, as more and more devices become communication capable with computing capabilities, these devices may also be used as devices part of system 100.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
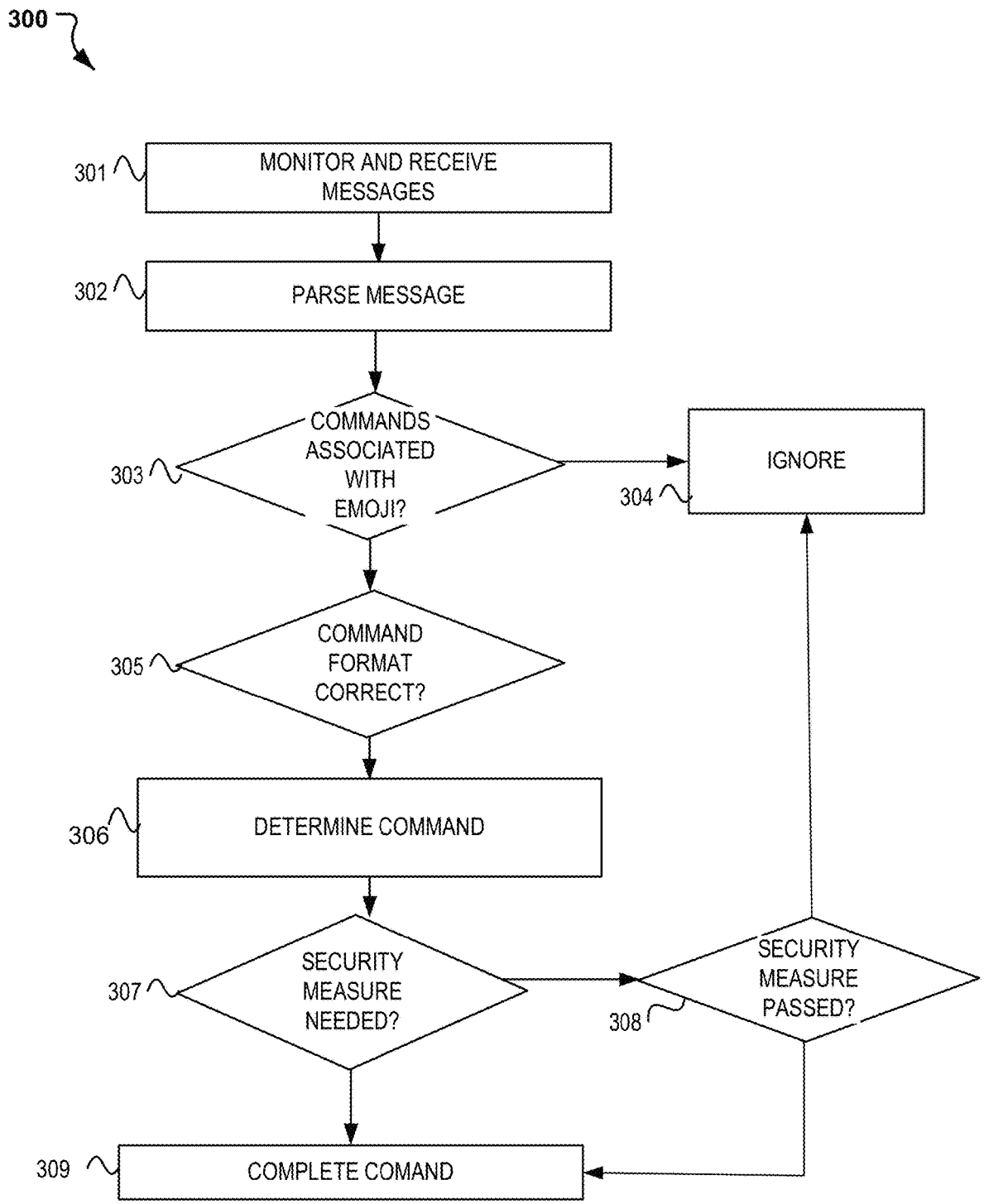
FIG. 3 is a flow diagram illustrating an exemplary emoji command implementation.

FIG. 3 is a flow diagram illustrating processes 300 of an exemplary emoji command implementation. Processes 300 may be implemented on a system such as system 100 of FIG. 1 according to some embodiments. According to some embodiments, processes 300 may include one or more of processes 301-309 which may be implemented, at least in part, in the form of executable code stored on a non-transitory, tangible, machine readable media that, when run on one or more processors, may cause the one or more processors to perform one or more of the processes 301-309.

At process 301, the system may be configured to monitor and receive messages, which may include entire message payloads from one or more messaging applications. A message payload may include the user authored portion of text in addition to messaging protocol information, such as data associated with identifying a sender, recipient, location information, and/or other data fields that the messaging application may use for interpreting a message. In some examples, the system may interface with an application programming interface of the one or more messaging applications to receive a stream of messages handled by the messaging application. In some embodiments, the system may monitor messages by scraping a chat box for new messages.

At process 302, the system may parse the messages received at process 301 for emoji based commands. In some examples, the system may be configured to receive messages from a plurality messaging applications. In such examples, the system may identify the messaging application as part of the parsing process. In some examples, the system may determine and/or identify which messaging application the message is received from. In some examples, the system may identify the messaging application from the API the system is using, which may target a particular messaging application. In some examples, the messaging application may provide information to the system identifying itself, such as the name of the application, a unique serial number, and/or the like. In some examples, the system may determine the identity of the messaging application based on the format of the messages received. Different messaging application may format messages in different ways and/or provide messages in different formats. As such, identifying the messaging application used for the received message may aid the system in parsing the message. For example, some messaging applications may provide messages in an unstructured data format while other applications may provide the messages in a structured data format. When messages are in a structured format with a particular order of data, the system may be able to easily parse messages from identifying the useful data fields. In some examples, the system may be configured to receive messages from a single particular messaging application, and therefore, may not need to identify the application.

In some examples, the system may parse the messages received at process 301 for usernames, emojis, product identifiers, and/or the like. In some examples, the message may be received in a semi-structured format such that the username (or other user identifier or ID, such as a phone number) for the sender and/or receiver of the message may be easily identifiable by the system. For example, the message may be received as a message payload with the username of the sender and/or receiver held in a different data field of the payload than the rest of the message. Different messaging applications may format message payloads with different numbers of fields and information. As such, the system may use the identified messaging application to parse out the user authored message, the sender, receiver, time stamp, and/or other relevant data.

In some examples, the message payload may include information that is normally hidden from a user. For example, a message payload may include a color identifier that may set the color of the text, font identifier, coordinates for indicating the location of the device sent the message, time stamp, forwarding information, social media statistical counts (e.g. likes, thumbs up, etc.), message number, and/or the like.

In some examples, such as when messages are received in an unstructured manner, the system may parse the message based on formatting what the identified messaging application uses. For example, one messaging application may use a messaging format such as "(user ID): (message)" wherein the message starts with a user identifier followed by a colon followed by a space followed by the user authored message. In some examples, the sender and receiver may be identified based on the alignment of the message. For example, messages of either the sender or receive may be formatted to left-aligned and the other right-aligned. As such, the system may parse messages based on the identification of the messaging application. In some embodiments, the system may be able to identify the messaging application based on the data formatting. For example, some data fields may use codes that are unique to the protocol used by the messaging application.

In some examples, the system may parse messages for special characters or metadata for indicating a user, product, subject, and/or the like. For example, the "@" is commonly used before a user identifier to tag a user and a "#" to tag or identify a certain theme or content.

In some examples, certain combination of characters may cause the messaging application to display a non-textual graphical image, such as an emoji. A common example is ":)," which may cause an emoji such as "☺" or something more elaborate to be displayed. Different messaging applications may use different combination of characters for different emojis and may support different number of emojis. The system may determine, based on the combination of characters and the identified messaging application, which emoji is being sent in the message.

At process 303, the system may determine whether any emoji based commands were used in the message. For example, the system may determine whether one or more emojis detected at process 303 in the message belong to any commands. The system may maintain a command table in a database, such as database 154 of FIG. 1, that links commands to emojis. The system may use the command table to identify if an emoji has an associated command.

In some examples, whether an emoji has an associated command may depend on the messaging application. In some examples, one emoji that is linked to a command in one messaging application may have a different command or no command linked in another messaging application. As such, the system may have different command tables for different messaging applications, and whether or not a particular emoji is linked to a command may depend on the identified messaging application used to send the message with the emoji.

In some examples, an emoji may be determined to be a command if it is a response to a message. For example, a user may have conducted an emoji based command to request money from the user. Certain replies to the request may cause the system to determine that the request is valid and execute the transfer of money corresponding to the request. For example, the system may monitor for a simple reply with a thumbs up emoji to the requesting message as confirmation and authorization for the system to execute the request. However, if the thumbs up emoji is not used in reply to a message, the system may not recognize the emoji as a command. Similarly other emoji commands may depend on the type of message, status of the message, time of the message, whether the message is in reply to another message with an emoji command, a forwarded message, and/or the like. Similarly, in some examples, the recipient of a request may be able to decline the request with a thumbs down emoji.

In some examples, if the system does not identify any emojis or emojis with an associated command, the system may ignore the message at process 304. If there are emojis that are associated with a command, the system may continue to process 306.

At process 305, the system may determine whether the one or more emojis identified in process 303 are in a recognizable format for a command or are part of a correct messaging type for actuating the command. For example, the proper format for a command using an emoji may be that a first username precedes the emoji and a second username follows the emoji in a message. Different emojis and commands may have different message patterns and formats for the system to execute the command associated with the emoji.

If the emoji is not used in a message with the correct formatting, message type, and/or pattern with other text and/or emojis in the message, the system may continue to process 304 and ignore the message. If the emoji is used in the message with correct formatting and in the correct message type, the system may continue to process 306.

At process 306, the system may determine the one or more actions for executing the command. In some examples, the actions may be an execution of a function which may interact with the API of one or more applications and sending one or more messages. For example, a command to send monetary funds may cause the system to identify a payment account associated with the users and cause a transaction between the users. Another different command may cause the system to purchase a product from a merchant and have the product delivered. Another command may cause the system to donate money to a charity account. Another command may cause the system to request room service from a hotel that the user is staying at. The system may have functions for each command, where some of the functions may interact with third party services through one or more APIs. For example, a function for a money transfer request may interact with an API with a payment provider to cause a fund transfer. In some examples, the system may maintain a database of usernames of the messaging application with associated accounts for the payment provider. In some examples, the system may use other user information, such as an email address or a linked social media account, to determine the associated payment account for the user.

In some examples, a function may cause the system to purchase a service or product from a merchant based on one of the emoji based commands. The system may link with an API of the merchant and an API of a payment system and conduct an order for the user by transferring payment from a payment account of the user on the payment system to a payment account of the merchant. The system may also provide the merchant with details of the order, addresses and/or other contact information for completing, delivering, and/or notifying the user of the order. In some examples, the system may link to an application that aggregates multiple merchants, such as an on-demand restaurant delivery/ordering application.

In some examples, the user may manually set the function for an emoji or combination of emojis. For example, a user may set a pizza emoji to cause the system to automatically order a user selected pizza from a user selected pizza restaurant and have the pizza delivered to a user selected address or an address that the user specifies in the message using the pizza emoji. In some examples, the user may manually disable one or more commands. In some examples, the user may be able to customize commands, such as set a default payment system or device or specify a payment system or device based on a particular emoji.

At process 307, the system may determine whether a security measure should be implemented for executing the command. For example, if the command causes the transfer of property, monetary funds, purchase of goods and/or servicers, and/or the like, the system may determine that one or more security measures should be implemented.

In some examples, each possible command may have a Boolean value that indicates to the system whether to implement a security measure or not. For example, if a command has a Boolean value of 0, the system may not implement a security measure. However, if a command has an associated Boolean value of 1, the system may implement the security measure. In other examples, such as when the system uses a tiered security measure, each command may have a value associated with it that indicates the level of security, if any, that should be implemented with the command.

If the system determines a security measure should be implemented, the system may continue to process 308 to implement the security measure. If the system determines that the command does not require a security measure, the system may continue to process 309 and complete the command.

At process 308, the system may implement one or more security measures. In some examples, the system may have multiple security measures and may use different security measures based on a risk assessment on the command. In some examples, the system may use multiple security measures to authenticate the user conducting the command. The system may implement more reliable or additional authentication measure for large exchange of funds, but less reliable authentication measures for routine and/or small exchange of funds.

In some examples, the system may have a tiered security system wherein different commands may use different levels of security. For example, at a first level, no security may be used. These may be reserved for causing the system to send badges (e.g., displayable icons and/or miniature images), digital/electronic rewards, and/or praise. At a second level, such as conducting an automated purchase of goods or services, the security level may simply require a confirmation. A third level, such as transferring money to a connected social media friend, may use authentication through a second user device of the user which cancels the transfer upon a cancellation request. A forth level, such as transferring money over a threshold amount and/or to other users that are not connected to the sender through social media, may request a login and password. As discussed above, the security level for the command may depend on a value associated with the command. In some examples, the security levels may be user specified.

In other embodiments, different number of tiers and different authentication methods for authorizing a command may be implemented and are contemplated herein. Upon implementing the security measure and the user sufficiently passing the security measure, the system may continue to process 309 and complete the command. In the case that the user fails the security measure, such as when the system receives a cancellation request or an incorrect authentication credential, the system may cancel the command and continue to process 304 where the command is ignored.

At process 309, the system may complete the command. Some exemplary commands, as will be discussed in more detail below, may include requesting monetary transfers from one or more individuals, transferring monetary funds to one or more individuals, purchasing a product, and/or the like. In some examples, a command may conduct an additional action. For example, a command to request funds may send a message requesting payment from one or more identified users. Additionally, after a certain predetermined time has passed without the system receiving commands from the recipients to conduct payment, the system may send reminders. In this manner, reminders are sent automatically by a third party system and the original sender is saved from having to feel like they are pestering the recipients. Furthermore, the system may reward individuals for acting in a timely manner. For example, the system may provide special badges or credit ratings for a user based on the user handling a request for payment in a timely manner. In some examples, special badges may be provided when the requestor is a charity. In this manner, users may publicize their support for a charity with the badge. In some examples, the badge may be custom created by the charity. Furthermore, these badges may serve as identifiers of charitable individuals. Other possible rewards may include coupons for goods or services.

In some examples, the commands may cause additional actions, as will be discussed in more detail below, where these additional action may include but are not limited to sending a private message, providing rewards, awarding badges, and/or the like.

In some embodiments, the completion of a command may include having one or more users sign up with the system. For example, the system may request a user requesting and/or sending monetary transfers to link a payment account with the system such that the system may complete the transfer. In some examples, the system may provide a message with a link to sign up and/or sign into a payment account to link with the username of the messaging application.

Figure 4:
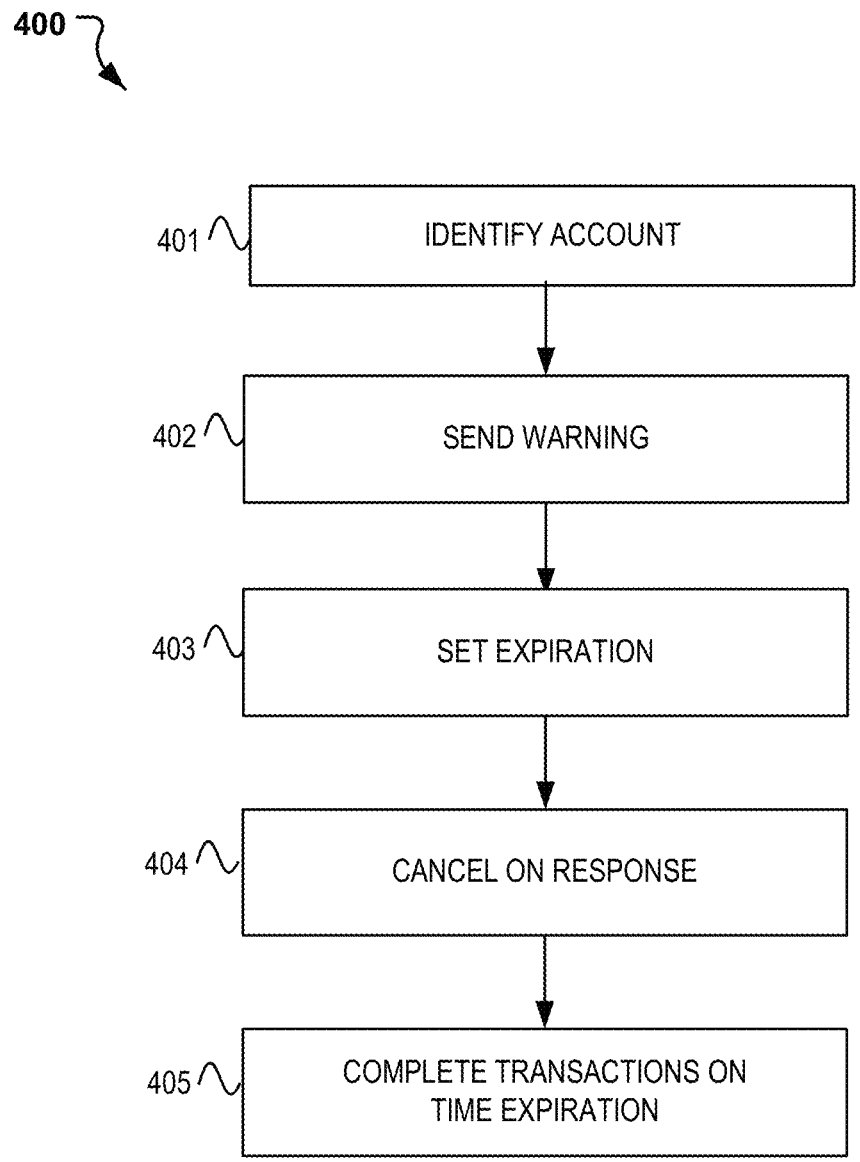
FIG. 4 is a flow diagram illustrating an exemplary implementation of authorizing an emoji based command.

FIG. 4 is a flow diagram illustrating processes 400 of an exemplary security, authentication, and/or authorization system for authorizing an emoji based command. According to some embodiments, processes 400 may include one or more of processes 401-405 which may be implemented, at least in part, in the form of executable code stored on a non-transitory, tangible, machine readable media that, when run on one or more processors, may cause the one or more processors to perform one or more of the processes 401-405. In some examples, process 308 of FIG. 8 may implements processes 400. In some examples, processes 400 may be implemented when an emoji based command for a transfer of funds.

At process 401, an account may be identified for implementing the security measure. In some embodiments, the system may use the account associated with the message sender for implementing the security measure. For example, the message sender may have sent a message that has an emoji command to send recipient user money as a transfer of fund or in exchange for goods and/or services.

In some examples, the system may identify the username of the sender and determine a payment system account associated with the username. The association between the account and username may have been set up at a previous time and held in non-transitory computer readable medium for recall. In some embodiments the system may maintain a database of usernames and associated payment accounts. In some embodiments, the messaging application used may link to a social media account that may provide information for the system to identify a payment account associated with the user. In some examples, the social media account may also handle providing credentials for accessing the payment account.

In some examples, multiple payment accounts may be associated with the username. In some examples, the user may be able to indicate with an emoji which account the system is used for a command. In some examples, there may be a default account that the system uses when the user has not specified in the emoji based command which account to use.

At process 402, the system may send a warning regarding submission of the emoji based command. In some examples, the system may request the user to login to complete the command. In some examples, the request may come as a private message sent to the user. The private message may be directed to the username used in the message with the emoji based command. In some examples, the warning may be a form of two factored authentication. For example, the system may send a private message to another account associated with the user other than the messaging application that was used for the emoji based command. For example, a user may have used a first account on IRC for implementing an emoji based command, and the system may send a warning through another messaging platform associated with the same user, such as email, SMS, and/or the like.

In some examples, the warning may provide the recipient of the warning a threshold or predetermined time to cancel the emoji based command. For example, a response with the word "cancel" or other responses within the predetermined time may cause the system to abort execution of the command. In this manner, a user does not have to log in or conduct any additional actions when issuing a command, but would be able to cancel the transaction in cases where the command was a mistake or fraudulent. This is a more convenient method of authentication over providing security credentials.

At process 403, the system may set an expiration timer for when a user may respond to the warning to cancel an action and/or command. In some examples, this may be a preset predetermined amount of time. In some examples, the expiration time length may be manually set by the user. In some examples, the expiration may occur after a predetermined amount of time after the system receives an indication that the user has read the message. For example, some messaging services and/or protocols may provide indications that a message has been read, such as message disposition notifications. In this manner, the expiration for the ability to cancel does not occur until after the system is ensured that the user has seen and/or knows about the warning. In some examples, there may be a second expiration that automatically cancels a command if the system does not receive an indication that the user has seen the warning within a predetermined amount of time. In this manner, intended recipients can have some reliability as to when to expect a command to be executed.

At process 404, the system may cancel a command upon the receipt of a user response or continue to process 405 when a cancel request is not received within the predetermined amount of time.

At process 405, once the expiration of a cancellation has occurred, the system may execute the command. The command may be a transfer of property, funds, and/or the like.

FIG. 5A-5E illustrates some exemplary emoji based command messages and responses from a system implementing the commands. In some examples, these messages may be the type of messages that a system implementing process 300 of FIG. 3 may receive, handle, and/or respond with.

Figure 5A:
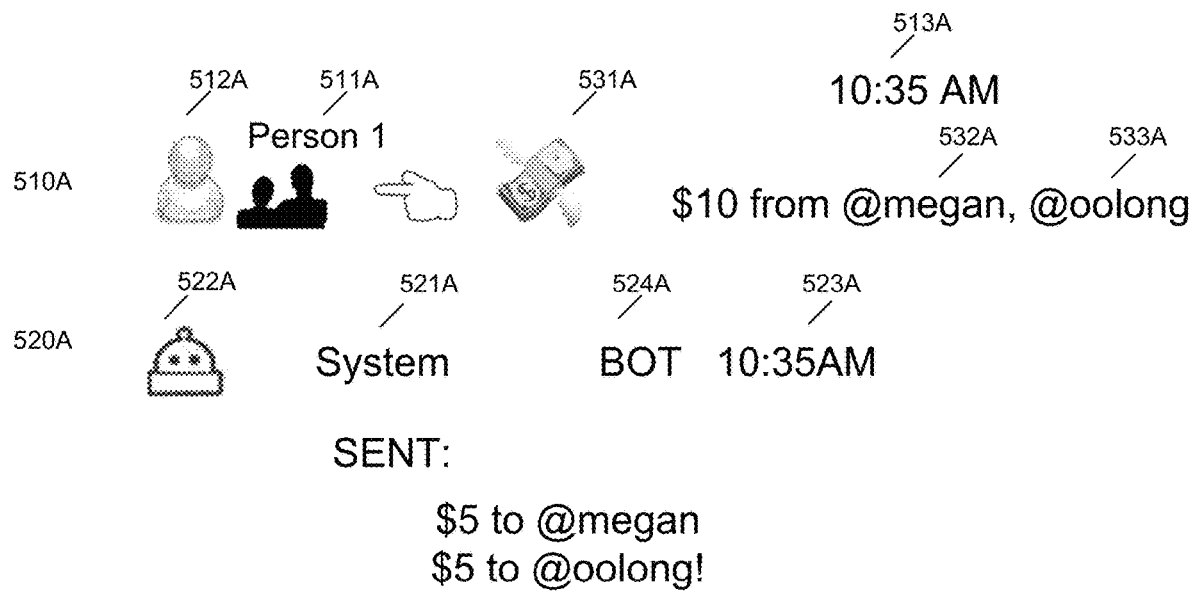

FIG. 5A illustrates an exemplary emoji based message 510A that may cause a system to execute the command and respond with a confirmation message 520A. In some examples, the messages may show the usernames 511A and 521A for the author of the messages. In some examples, the messaging application may also display an image associated with each user, 512A and 522A. In some examples user images 512A and 522A may be selected by their respective users and/or administrators. In some examples, the messaging application may display a time stamp 513A and 523A indicating the time of each message. In some examples, the message application may indicate that user 521A is handled by a computer system by indicator 524A.

As shown, the three emoji combination 531A in this example may translate to a command to transfer the following value $10 to users 532A and 533A denoted by the @ symbol. In some examples, instead of the command using a combination of emojis, the command may be a single emoji. In this example, the command may cause the system to split and send the value to the identified users equally. In some examples, the value may be split to more users if the message identified additional users with an @ symbol. In some examples, instead of splitting the value, each user may receive the value amount, for example ten dollars to each user 532A and 533A instead of five dollars each. In some examples, the money may be sent to a single user instead of multiple users. In some examples, the user may be able to change the split percentage using one or more emojis such that one or more users are requested to pay more or less of the total.

As shown, the system may provide confirmation through message 520A which confirms the user's commands once performed. In this example, five dollars was sent to each user megan and oolong.

Figure 5B:
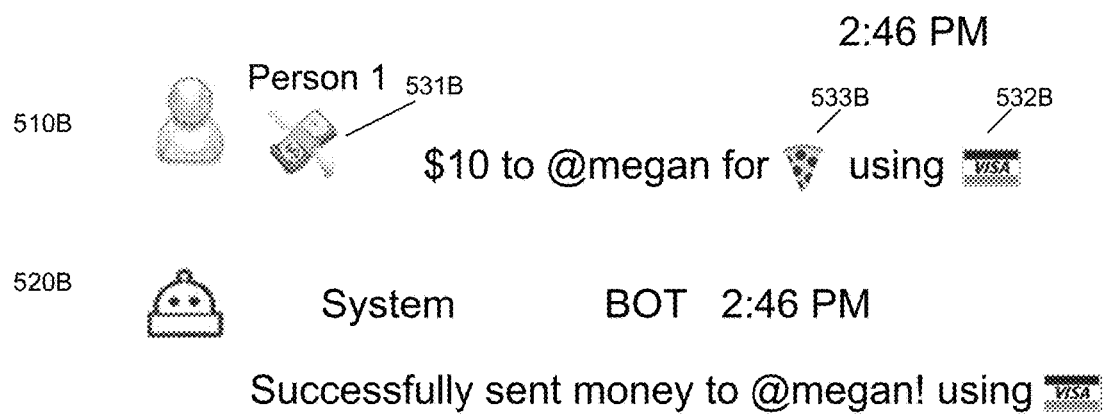

FIG. 5B is an exemplary emoji based message 510B that may cause a system to execute a command for sending money to a user with a particular payment instrument and provide confirmation message 520B. As shown, the money emoji 531B may indicate to a system which monitors for emoji based commands, such as a system implementing process 300 of FIG. 3, that the author intends to send money to someone. The system may then check for a particular ordering of content in the message for the command to be valid and executed. For example, the money emoji 513B followed by a value and a user identifier is one such ordering of content. In some examples, the system may also look for another emoji 532B that may indicate which payment instrument is to be used. For example, emoji 532B may indicate that a particular Visa® credit card be used as the payment instrument instead of a default payment instrument. In some examples, if emoji 532B is not provided another funding instrument may be used by the system to conduct the payment, such as a default payment instrument set by the user.

In some examples, the message may include an additional emoji 533B. Emoji 533B may have a command associated with it, such as ordering pizza. However, the system may determine that the emoji is not used in the correct format to order pizza, and therefore, ignore the command from emoji 533B.

The system may send a reply message 520B once completing the command. Here the reply may confirm who the funds were transferred to and the payment account used. In some examples, the system may use a part of message 510B to create message 520B. In some examples the system and/or user device may keep a log of these messages as records.

FIG. 5C illustrates an exemplary emoji based message 510C that may cause a system to execute a command to request money from one or more users. As shown, the combination of emojis 531C may indicate to a system that the user would like to request money from one or more users. In some examples, the @ sign may tag users in the messaging application such that tagged users will see the message. As such, the system may not need to send the request to the users. In some embodiments, the system may send a request for money to the user in a separate message. In some embodiments, a link used for paying the requester may be sent, such that when a user logs in the correct transfer may be made without the recipient needing to enter in the value of the transfer and/or entering an identifier for the account in which the money is transferred to.

In some examples, the system may send the author of the message a confirmation message 520C of the request. Confirmation message 520C may indicate what was requested and from whom. In some examples, the value requested in the message may be split among the users identified in the message. In some examples, the value may be each requested from each user identified in the message. In some examples, there may be an emoji and/or combination of emojis that indicates that the value should be split over the user and a different emoji to indicate that the requested value is to each user, rather than being split.

FIG. 5D illustrates an exemplary message that may be sent to one or more users as a reminder to send money to a requester. In some examples, the system may use some of the message sent from the user as part of the message in the reminder. For example, portion 541 of the reminder may be taken from the message sent by the user, such as message 501C. Furthermore, the reminder message may tag multiple users from the group such that other individuals may be notified of who has paid and as a form of shaming or incentivizing users who have not paid. The reminder, however, may be provided in a whimsical and light hearted manner by using emojis such that the reminder is gentle. The reminder may include a time element indicating how long ago the request was made, which the command system may keep track of.

FIG. 5E illustrates a message from the system that may be sent when a user has satisfied a request. In some examples, additional individuals may be tagged in the message such that other people that were part of the party may also be notified of who has paid. This may be used as a form of motivation to other people to ensure they are not the last to complete the request. The user is rewarded for paying and the message doubles as social pressure to encourage others to pay also. In some examples, the notification of payment may include a portion of the original message requesting money, such that user may know what the payment is for. Furthermore, the system may provide a badge, such as emoji 561, which may be viewed on the user profile. The user may collect several emojis or badges and the system may show the number of badges received and/or the number of outstanding requests that the user has. The system may also keep track of an average number of days that a user takes to complete a request and provide that information publicly and/or to friends. In this manner, user may be able to quickly determine the credit worthiness of the requester. In some examples, the system may provide different badges determined based on how quickly a user completes a request. For example, a badge for when requests are completed in under an hour, under a day, under 3 days, under a week, etc. In some examples, the system may store statistics on each request completion and provide them for viewing to friends and/or the public. In some examples, the statistics may be shown in a graph.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Furthermore, digital images, other than emojis, may also be used with the various features, systems, and processes described herein. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory storing instructions; and
one or more hardware processors configured to execute the instructions to cause the system to:
receive a user-authored message in a messaging application installed on a user device, the user-authored message comprising a string of user inputs including at least an emoji;
parse the string of the user-authored message received in the messaging application to identify user identification information and the emoji;
detect that the emoji of the user-authored message is linked to an emoji-based command in a command table of a database;
determine a security level corresponding to the emoji-based command, wherein the security level is one of a plurality of security levels, and wherein each emoji-based command in the command table corresponds to one of the plurality of security levels; and
process an action associated with the emoji-based command using the security level and the user identification information.

2. The system of claim 1, wherein the emoji-based command includes a monetary transfer between a user associated with the user device and another user identified in the user-authored message.

3. The system of claim 1, wherein the security level is determined based on a threshold monetary amount.

4. The system of claim 1, wherein the processing the action using the security level and the user identification information includes receiving a confirmation and an authorization from the user device.

5. The system of claim 4, wherein receiving the confirmation includes receiving, from the messaging application on the user device, an emoji associated with an authorization command, wherein the emoji associated with the authorization command is different than the emoji inside the user-authored message.

6. The system of claim 1, wherein the emoji-based command includes a request for a payment on an account of a merchant.

7. The system of claim 6, wherein the request for a payment on an account of a merchant includes a link between an API of the merchant and an API of a payment system for transferring a monetary amount for the payment on the account of the merchant.

8. A method comprising:
receiving, by one or more hardware processors, a user-authored message in a messaging application installed on a user device, the user-authored message comprising a string of user inputs including at least one emoji;

parsing, by the one or more hardware processors, the string of the user-authored message received in the messaging application;

identifying, based on the parsing, user identification information and an emoji based on the user-authored message;

identifying an emoji-based command, based on the emoji of the user-authored message, the emoji-based command corresponding to one of the emoji-based commands in a command table of a database;

determining, by the one or more hardware processors, a security level associated with the emoji-based command, wherein the security level is one of a plurality of security levels, and wherein each emoji-based command in the command table corresponds to one of the plurality of security levels; and processing, by one or more hardware processors, an action associated with the emoji-based command using the security level and the user identification information.

9. The method of claim 8, wherein the emoji-based command includes a monetary transfer between a user associated with the user device and another user identified in the user-authored message.

10. The method of claim 8, wherein the security level is determined based on a threshold monetary amount.

11. The method of claim 8, wherein processing the action using the security level includes receiving a confirmation and an authorization from the user device.

12. The method of claim 11, wherein the receiving the confirmation includes receiving, from the messaging application on the user device, an emoji associated with an authorization command, wherein the emoji associated with the authorization command is different than the emoji inside the user-authored message.

13. The method of claim 8, wherein the emoji-based command includes a request for a payment on an account of a merchant.

14. The method of claim 13, wherein the request for a payment on an account of a merchant includes a link between an API of the merchant and an API of a payment system for transferring a monetary amount for the payment on the account of the merchant.

15. A non-transitory machine-readable medium having stored thereon machine-readable instructions executable to cause a machine to perform operations comprising:

receiving a user-authored message in a messaging application installed on a user device, the user-authored message comprising a string of user inputs including at least one emoji;

parsing the string of the user-authored message received in the messaging application;

identifying, based on the parsing, user identification information and an emoji based on the user-authored message;

determining, based on a command table of the messaging application, that the emoji of the user-authored message is associated with an emoji-based command;

determining a security level associated with the emoji-based command, wherein the security level is one of a plurality of security levels, and wherein each emoji-based command in the command table corresponds to one of the plurality of security levels; and processing an action associated with the emoji-based command using the security level and the user identification information.

16. The non-transitory machine-readable medium of claim 15, wherein the emoji-based command includes a monetary transfer between a user associated with the user device and another user identified in the user-authored message.

17. The non-transitory machine-readable medium of claim 15, wherein the security level is determined based on a threshold monetary amount.

18. The non-transitory machine-readable medium of claim 15, wherein processing the action using the security level includes receiving a confirmation and an authorization from the user device.

19. The non-transitory machine-readable medium of claim 18, wherein receiving the confirmation includes receiving, from the messaging application on the user device, an emoji associated with an authorization command, wherein the emoji associated with the authorization command is different than the emoji inside the user-authored message.

20. The non-transitory machine-readable medium of claim 15, wherein the emoji-based command includes a request for a payment on an account of a merchant.

* * * * *